US006371692B1

(12) United States Patent
Fatigati

(10) Patent No.: US 6,371,692 B1
(45) Date of Patent: Apr. 16, 2002

(54) DEVICE FOR EARLY DETECTION OF UNDERGROUND UTILITIES DURING EXCAVATION AND METHOD OF USING THE SAME

(76) Inventor: Francis Robert Fatigati, 32 Hutchinson Rd., Allentown, NJ (US) 08501

( * ) Notice: Subject to any disclaimer, the term of this patent is extended or adjusted under 35 U.S.C. 154(b) by 0 days.

(21) Appl. No.: 09/310,082

(22) Filed: May 11, 1999

(51) Int. Cl.[7] .............................................. F16L 57/00
(52) U.S. Cl. ........................ 405/157; 405/176; 256/26; 116/209
(58) Field of Search ................................ 405/157, 176, 405/184; 256/1, 26; 116/209

(56) References Cited

U.S. PATENT DOCUMENTS

| 795,646 A | * | 7/1905 | Plummer | 256/26 |
|---|---|---|---|---|
| 1,588,897 A | | 6/1926 | Marston | 405/258 |
| 2,835,223 A | * | 5/1958 | Erickson | 256/26 X |
| 3,115,861 A | | 12/1963 | Allen | 405/157 |
| 3,118,352 A | | 1/1964 | Ray et al. | 40/612 |
| 3,282,057 A | | 11/1966 | Prosser | 405/157 |
| 3,568,626 A | | 3/1971 | Southworth, Jr. | 116/209 |
| 3,581,703 A | | 6/1971 | Hosack | 116/67 R |
| 3,633,533 A | * | 1/1972 | Allen et al. | 116/200 |
| 3,675,432 A | | 7/1972 | Keene | 405/157 |
| 4,623,282 A | * | 11/1986 | Allen | 405/157 |
| 4,629,364 A | | 12/1986 | Sayles et al. | 405/157 |
| 4,838,525 A | * | 6/1989 | Snow et al. | 256/26 |
| 4,949,664 A | * | 8/1990 | Wallace | 116/209 |
| 4,982,535 A | * | 1/1991 | Pickett | 256/26 X |
| 4,991,536 A | * | 2/1991 | Moshofsky | 116/209 |
| 5,577,710 A | * | 11/1996 | Kirby | 256/26 X |
| 5,626,926 A | | 5/1997 | Roberts | 428/14 |
| 5,879,103 A | * | 3/1999 | Baillie | 256/1 X |
| 5,967,214 A | * | 10/1999 | Beretta | 256/26 X |

* cited by examiner

Primary Examiner—David Bagnell
Assistant Examiner—Tara L. Mayo
(74) Attorney, Agent, or Firm—Arthur L. Plevy; Duane Morris

(57) ABSTRACT

A device for ground burial with an underground utility line or element and useful for early detection of the underground utility line or element during the excavation. The device has at least one sheet of non-conductive material, indicia on the sheet forming a cautionary message indicating the presence of an underground utility line or element, and at least one support element for vertically positioning the device in the ground. Further, a method for early detection of a underground utility line or element during excavation. The method includes burying at least one of the above-described devices in the ground along a side of an underground utility line or element so that the device is positioned vertically in the ground and extends up toward the surface of the ground from the underground level of the underground utility line or element.

29 Claims, 3 Drawing Sheets

US 6,371,692 B1

DEVICE FOR EARLY DETECTION OF UNDERGROUND UTILITIES DURING EXCAVATION AND METHOD OF USING THE SAME

FIELD OF THE INVENTION

This invention relates to devices for detecting underground utility lines or elements, and in particular, to devices which are buried with underground lines or elements for providing an early detection or warning of such utility lines or elements during excavation.

BACKGROUND OF THE INVENTION

There are many different types of underground utility lines or elements, such as wires, cables, conduit, sewer pipes and sewer connections, valves, water lines, gas lines, and other like lines or elements. These lines or elements are typically used for electrical power or signal transmission, as well as for conveying solids, liquids and gases. When such utility lines or elements are excavated, their exact location must be identified in order to prevent damage thereto during excavation.

Underground utility lines or elements are usually located by sending appropriate personnel out to the excavation site to flag or otherwise mark the ground overlying the utility lines or elements. In order to accomplish this, the personnel must rely on certain methods and techniques for identifying the location of the utility. For example, buried power or water lines are often designated as being located a given number of feet below the surface of the ground or from some reference or bench mark.

Unfortunately, frequently referenced marks may disappear and various construction projects may alter the ground level. Consequently, when excavation becomes necessary for making repairs, upgrades, or alterations, the precise location of the utility lines or elements is virtually incapable of being determined. This makes their excavation a generally inexact undertaking as the location of the utility line or element must be estimated. Hence, cautious excavation either manually or with power equipment must be undertaken. Frequently, an erroneous estimate can result in damage to the excavated utility line or element, or other utility lines or elements may be damaged which were not expected to be at the location. Further, indiscriminate or careless excavation, particularly with power equipment and often with manually operated power equipment can be hazardous to personnel engaged in such operations. This is particularly true when the underground utility carries a toxic chemical material or is an electric or gas supply line.

The prior art has made many attempts to address this problem. For example, certain electronic techniques and methods have been developed which assist in the location of underground utility lines or elements during excavation. However, these techniques are often not used by construction crews for various reasons.

Another technique and method for locating underground utility lines or elements uses generally inexpensive frangible and non-frangible tapes with warning indicia or other attention-compelling means. These tapes are usually buried above the utility line or element so that they rest directly on top of or slightly above the utility line or element.

The problem with these tapes is that once the tape is found by the excavation equipment, the equipment more often than not, has already damaged the utility line or element. Additionally, injury to the excavation personnel as a result of the damage to the utility line or element may have also occurred.

Accordingly, a device is needed for providing early detection or warning of underground utility lines or elements during excavation.

SUMMARY OF THE INVENTION

In accordance with the invention, a device for ground burial with an underground utility line or element and useful for providing early detection of the utility line or element during excavation. The device comprises at least one sheet of non-conductive material, indicia on the sheet forming a cautionary message that indicates the presence of an underground utility line or element, and at least one support element coupled to the sheet for vertically positioning the device in the ground.

In further accordance with the invention, a method for providing early detection of an underground utility line or element during the excavation. The method comprises the steps of providing at least one of the devices described immediately above and burying it in the ground along a side of an underground utility line or element so that the device is positioned vertically in the ground and extends up toward the surface of the ground from the underground level of the utility line or element.

BRIEF DESCRIPTION OF THE DRAWINGS

The advantages, nature, and various additional features of the invention will appear more fully upon consideration of the illustrative embodiments now to be described in detail in connection with the accompanying drawings wherein.

It is to be understood that these drawings are for purposes of illustrating the concepts of the invention and are not to scale.

DETAILED DESCRIPTION OF THE INVENTION

Figure 1:
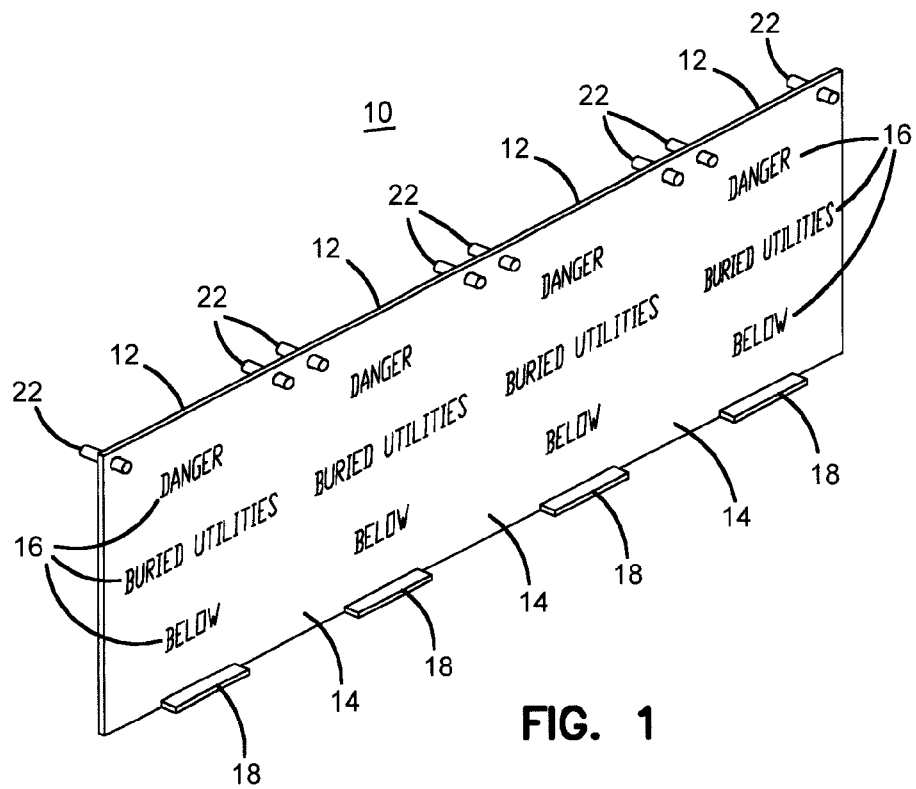
FIG. 1 is a perspective view of an underground utility early detection device according to an embodiment of the invention.
Figure 3:
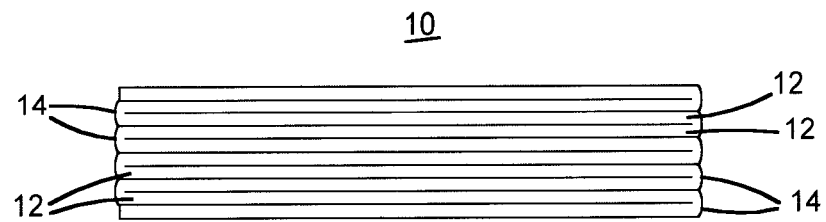
FIG. 3 is an elevational view showing the device folded for storage.

FIG. 1 shows a device 10 for early detection or warning of an underground utility line or element during the excavation thereof according to an embodiment of the invention. The device 10 comprises a plurality of substantially rigid, non-frangible sheets 12 hingedly connected to each other and adapted for vertical installation beneath the surface of the earth or ground adjacent the full length of a corresponding underground utility line or element. Each sheet 12 has a height which corresponds to about ⅔ the depth of the trench it is to be used in. Accordingly, a typical sheet 12 will stand about 18 to 24 inches in height. The sheets 12 are connected to each other at their side edges using any suitable hinge element 14. The hinge elements 14 permit the sheets 12 to be conveniently folded for storage prior to use as shown in FIG. 3.

Figure 2:
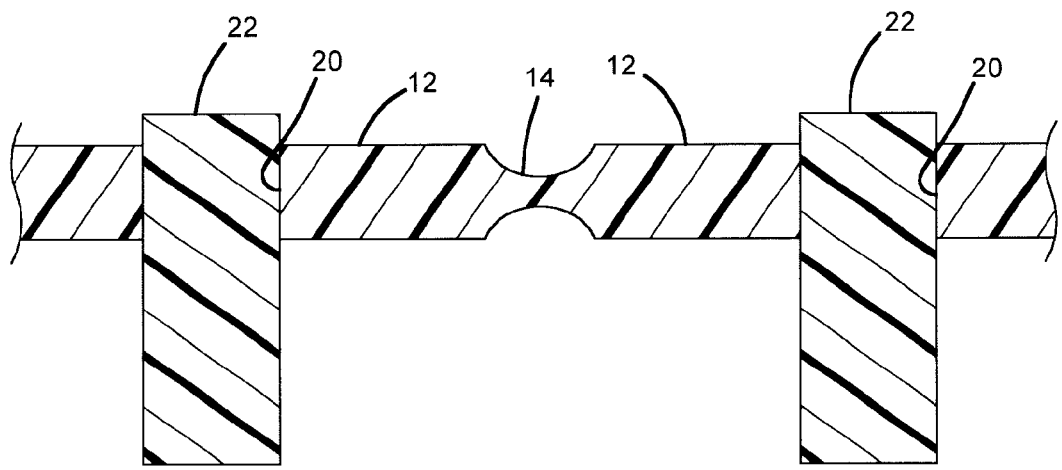
FIG. 2 is an end view showing an embodiment of the hinge element.

Referring to FIGS. 1 and 2, at least one support foot 18 is provided at the lower edge of each sheet 12, and each sheet 12 includes at least two through-holes 20 with pegs 22 removably installed therein from the indicia side of the sheets 12, typically in a friction fit manner. The support foot and pegs cooperate to vertically stabilized the sheets 12 when the device 10 is installed in the ground as will be explained further on.

The sheets 12 are preferably composed of non-conductive plastic material having a color which is in sharp contrast to the color of the backfill in which it is buried. The use of plastic material permits the sheets 12 to be fabricated using conventional plastic forming manufacturing methods. Moreover, the sheets 12 can be fabricated as a single foldable unit with unitarily formed "living" type hinge elements 14 between the sheets 12 (FIG. 2). This permits the length of the device 10 to be selected by merely cutting along the hinge element 14.

The sheets 12 have indicia 16 printed or otherwised formed on one or both sides thereof. The indicia 16 displays a cautionary message which warns of the presence and type of an adjacent underground utility line or element. As an example, the cautionary message formed by the indicia 16 can read "DANGER BURIED UTILITIES BELOW". The cautionary message is repeated on the sheets 12 so that it extends the full length of utility line or element. The indicia 16 should be substantially invulnerable to erasure, rubbing off, and underground chemical or electrolysis activity. This can be accomplished, for example, by applying commercially available transparent protective films over the indicia. Other conventional methods can be used for forming substantially invulnerable indicia 16 on the sheets 12.

Figure 4:
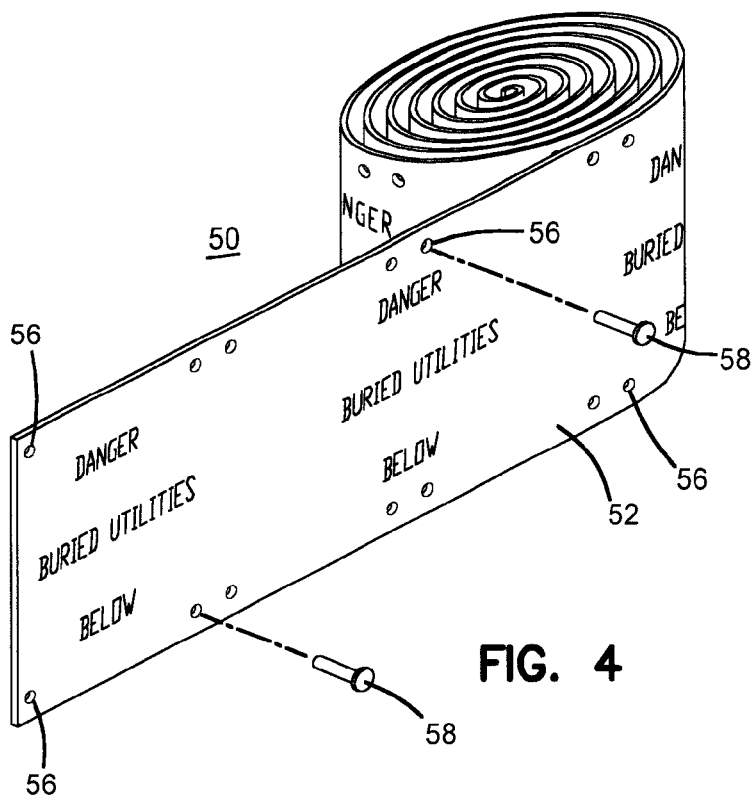
FIG. 4 is a perspective view of an underground utility early detection device according to a second embodiment of the invention.

FIG. 4 shows a device 50 for early detection or warning of an underground utility line or element during the excavation thereof according to a second embodiment of the invention. The device 50 comprises a flexible non-frangible sheet 52 with a plurality of spaced apart throughholes 56 formed adjacent the side edges thereof. The through-holes 56 receive enlarged-head pegs 58 which permit the device 50 to be installed vertically beneath the surface of the earth or ground adjacent the full length of a corresponding underground utility line or element as will be described further on. The sheet 52 has a height which corresponds to about ⅔ the depth of the trench it is to be used in (typically about 18 to 24 inches in height). The flexible nature of the sheet 52 permit it to be conveniently rolled for storage prior to use.

The sheet 52 is preferably composed of non-conductive plastic material which permits it to be easily cut or trimmed to any desired length. The plastic material can have a color which is in sharp contrast to the color of the backfill in which it is buried. The sheet 52 has indicia 54 printed or otherwised formed on one or both sides thereof similar to the embodiment of FIG. 1.

Figure 5A:
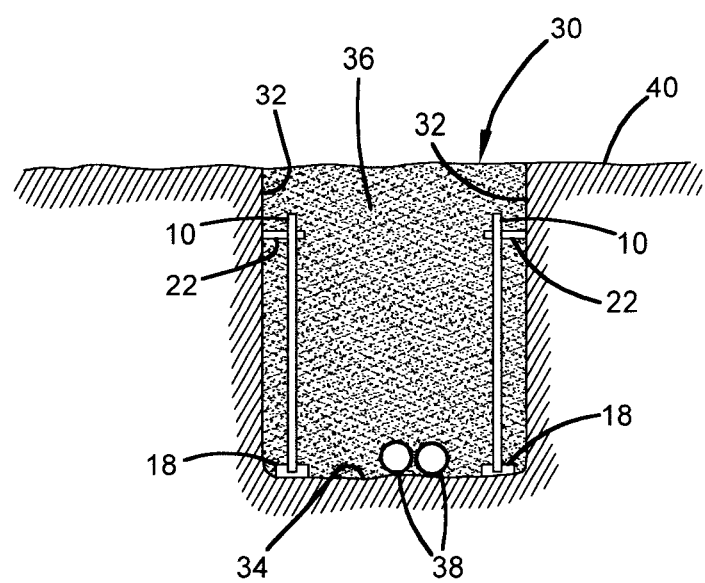
FIGS. 5A and 5B are schematic views showing a method of using the inventive device for early detection of an underground utility line or element during the excavation.

FIG. 5A shows a method of using the device of FIG. 1 to provide early detection or warning of the utility line or element during excavation. An elongated trench 30 is excavated about 30 inches into the earth or ground from the exterior surface 40 thereof. The trench 30 typically has a substantially horizontal bottom surface 34 and substantially vertical and parallel side surfaces 32. Centrally disposed on the bottom surface 34 of the trench is a utility line or element arrangement 38 that extends longitudinally through the trench 32. It is to be understood that the reference herein to an underground utility line or element refers to any type of underground line or element, including but not limited to underground gas, electric, telephone, sewer, water or related utility lines or elements which typically contain outer jackets, pipes or cables of metal, ceramic or plastic materials.

Two locating devices 10 are typically used in the trench 30 to define the outer boundaries thereof when the devices 10 are uncovered during a subsequent excavation. The devices 10 are first unfolded and the pegs 22 installed in the through holes 20 of the sheets 12. Next, each device 10 is positioned generally vertically in the trench 30 adjacent to a corresponding trench side wall 32 so that the device feet 18 are positioned on the bottom horizontal surface 34 of the trench 30 with the ends of the pegs 22 in contact with or penetrating their corresponding trench side wall 32. This orients the devices 10 generally parallel to each other in a spaced apart relationship, with the devices 10 extending vertically up from the underground utility line or element arrangement 38 disposed therebetween. The trench 30 is then filled with the appropriate backfill material 36 such as dirt, sand or a combination thereof to bury the underground utility line or element arrangement 38 and the devices 10.

Figure 5B:
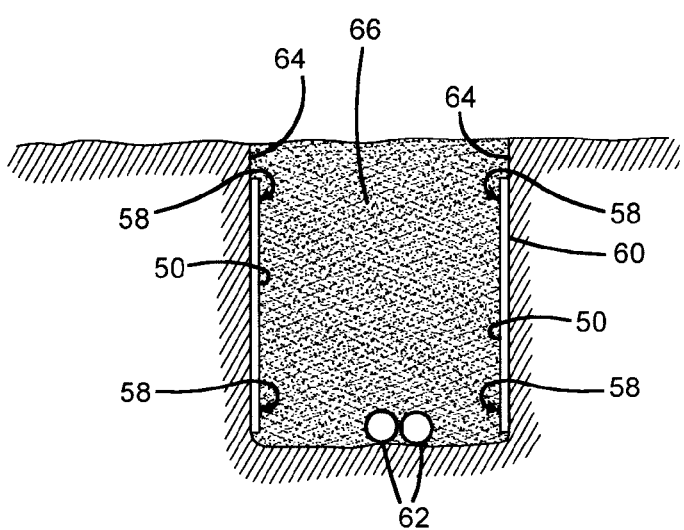

FIG. 5B shows a method of using the device of FIG. 4 to provide early detection or warning of the utility line or element during excavation. An elongated trench 60 is excavated and a utility line or element arrangement 62 is positioned therein as described above. Two locating devices 50 (cut from one or more rolls) are draped generally vertically against the side walls 64 of the trench 60 using the rivet-shaped pegs 58 which are inserted through the through-holes 56 and driven into the side walls 64 of the trench 60. The trench 60 is then filled with the appropriate backfill material 66 to bury the underground utility line or element arrangement 62 and the devices 50.

As is now apparent, the present invention disclosure advantageously sets forth a relatively inexpensive, rapidly installed device for early detection or warning of underground utility lines or elements during excavation. When the devices are used as described herein, excavation or digging into the earth, will uncover the devices long before any utility line or element disposed at the bottom thereof is placed into jeopardy by the excavation process. The uncovered devices disclose the boundaries of the associated trench. If the devices include indicia, the type of utility line or element excavated can then be ascertained.

While the foregoing invention has been described with reference to the above embodiments, various modifications and changes can be made without departing from the spirit of the invention. Accordingly, all such modifications and changes are considered to be within the scope of the appended claims.

What is claimed is:

1. A device for ground burial in a trench containing an underground utility line or elements, the device being useful for defining an outer boundary of the trench when the device is uncovered during the excavation, thereby warning of the presence of the underground utility line or element, the device comprising:

at least one sheet of non-conductive material;

indicia on the at least one sheet forming a cautionary message for indicating the presence of an underground utility line or element; and at least one support element coupled to the at least one sheet for vertically positioning the device against a sidewall of a trench containing the underground utility line or element to be detected by the device.

2. The device according to claim 1, wherein the at least one sheet comprises a plurality of substantially rigid sheets of non-conductive material arranged in an inline manner and hinged to each other by hinge elements.

3. The device according to claim 2, wherein the sheets and the hinge elements form a single unitarily formed unit.

4. The device according to claim 2, wherein the hinge elements permit the sheets to be folded together.

5. The device according to claim 1, wherein the cautionary message formed by the indicia is repeated along the length of the device.

6. The device according to claim 1, wherein the at least one support element comprises a support foot disposed at a bottom edge of the at least one sheet.

7. The device according to claim 1, wherein the at least one support element comprises at least one peg which can be fixedly inserted through the at least one sheet.

8. The device according to claim 1, wherein the non-conductive material comprises plastic.

9. The device according to claim 1, wherein the at least one sheet is flexible.

10. The device according to claim 9, wherein the flexibility of the at least one sheet permits the sheet to be rolled.

11. A method for detecting an underground utility line or element during excavation, the method comprising the steps of:

providing a device comprising at least one sheet of non-conductive material including indicia thereon in the form of a cautionary message, the message indicating the presence of an underground utility line or element; and burying the device in the ground along side of an underground utility line or element so that the device is positioned vertically in the ground and extends up toward the surface of the ground from the underground level of the underground utility line or element.

12. The method according to claim 11, further comprising the steps of:

providing a second one of the devices; and burying the second device in the ground along a second side of the underground utility line or element so that the second device is positioned vertically in the ground and extends up toward the surface of the ground from the underground level of the underground utility line or element.

13. The method according to claim 12, wherein the devices extend along the entire length of the underground utility line or element.

14. The method according to claim 11, wherein the underground utility line or element is selected from the group of consisting of gas, electric, telephone, sewer, and water lines or elements.

15. The method according to claim 11, wherein the burying step includes the steps of:

vertically positioning the devices against opposing side walls of a trench that contains the underground utility line or element; and filling the trench with a backfill material.

16. The method according to claim 11, wherein the at least one sheet comprises a plurality of substantially rigid sheets of non-conductive material arranged in an inline manner and hinged to each other by hinge elements.

17. The method according to claim 16, wherein the sheets and the hinge elements form a single unitarily formed unit.

18. The method according to claim 16, wherein the hinge elements permit the sheets to be folded together.

19. The method according to claim 16, wherein the cautionary message formed by the indicia is repeated along the length of the device.

20. The method according to claim 11, wherein the device includes a support foot disposed at a bottom edge of the at least one sheet.

21. The method according to claim 11, wherein the device includes at least one peg extending through the at least one sheet.

22. The method according to claim 11, wherein the non-conductive material comprises plastic.

23. The method according to claim 11, wherein the device extends along the entire length of the underground utility line or element.

24. The method according to claim 11, wherein the burying step includes the steps of:

vertically positioning the device against a side wall of a trench that contains the underground utility line or element; and filling the trench with a backfill material.

25. The method according to claim 11, wherein the underground utility line or element is selected from the group of consisting of gas, electric, telephone, sewer, and water lines or elements which contain outer jackets, pipes or cables.

26. The method according to claim 11, wherein the at lease one sheet is flexible.

27. The method according to claim 26, wherein the flexibility of the at least one sheet permits the sheet to be rolled.

28. A method for detecting a underground utility line or element during excavation, the method comprising the steps of:

providing a device comprising at lease one sheet of non-conductive material including indicia thereon in the form of a cautionary message, the message indicating the presence of an underground utility line or element; and burying the device in a trench containing an underground utility line or element so that the device is positioned vertically in the trench along side of the utility line or element and extends up toward the surface of the ground thereby defining an outer boundary of the trench when the device is uncovered during the excavation and in so doing, warning of the presence of the underground utility line or element.

29. The method according to claim 28, further comprising the steps of:

providing a second one of the devices; and burying the second device in the trench along a second side of the underground utility line or element so that the second device is positioned vertically in the trench and extends up toward the surface of the ground thereby defining a second outer boundary of the trench when the device is uncovered during the excavation and in so doing, warning of the presence of the underground utility line or element.

* * * * *